(12) United States Patent
Thomson

(10) Patent No.: US 8,763,300 B1
(45) Date of Patent: Jul. 1, 2014

(54) METHOD AND MEANS OF DISBURSING OR DISPLAYING FISH ATTRACTANT INSERT FROM A DIVER

(76) Inventor: James D. Thomson, Bellevue, OH (US)

(*) Notice: Subject to any disclaimer, the term of this patent is extended or adjusted under 35 U.S.C. 154(b) by 351 days.

(21) Appl. No.: 13/238,558

(22) Filed: Sep. 21, 2011

(51) Int. Cl.
*A01K 85/01* (2006.01)
(52) U.S. Cl.
USPC ............................................ 43/17.6; 43/42.06
(58) Field of Classification Search
CPC ...................................................... A01K 85/01
USPC .............................. 43/17.5, 42.06, 17.6, 42.22
See application file for complete search history.

(56) References Cited

U.S. PATENT DOCUMENTS

| | | | | |
|---|---|---|---|---|
| 4,407,472 A | * | 10/1983 | Beck | 248/89 |
| 4,581,839 A | * | 4/1986 | Mattison | 43/17.6 |
| 4,589,221 A | * | 5/1986 | Mattison | 43/17.6 |
| 4,610,103 A | * | 9/1986 | Steinman | 43/17.6 |
| 5,159,774 A | * | 11/1992 | Bennis et al. | 43/17.5 |
| 5,855,084 A | * | 1/1999 | Huddleston et al. | 43/17.5 |
| 6,209,254 B1 | * | 4/2001 | Sylla et al. | 43/42.09 |
| 2006/0005457 A1 | * | 1/2006 | Harris et al. | 43/42.06 |
| 2006/0185216 A1 | * | 8/2006 | Bogess | 43/17.5 |
| 2009/0223109 A1 | * | 9/2009 | Makowski | 43/17.6 |

* cited by examiner

*Primary Examiner* — Kimberly Berona
(74) *Attorney, Agent, or Firm* — Jerry Semer

(57) ABSTRACT

This invention is a modification of a Diver. Added to the diver is an insert that is a semirigid, cylindrical rod. The diver is modified with a cavity with cupped ends with open top and sides in which the insert is placed. A strap arches over the center of the cavity and the insert. The insert can be a chemical light, a chemical light coated with fish attractin scent fish attracting scent or coated with fish attracting scent. The insert are interchangeable. In the preferred embodiment, the diver has two inserts that can of same type attractant or a different type of attractant. The two fish attracting insert within the cavities run parallel to the centerline of the main body and parallel to each other.

12 Claims, 2 Drawing Sheets

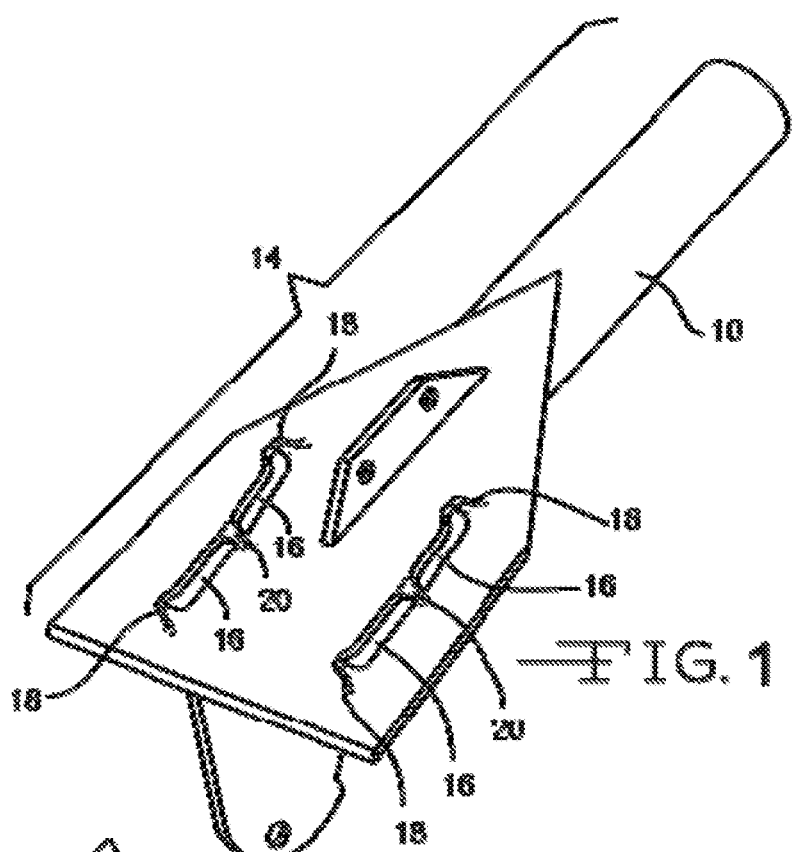
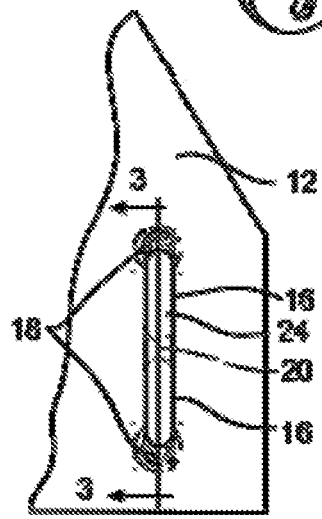
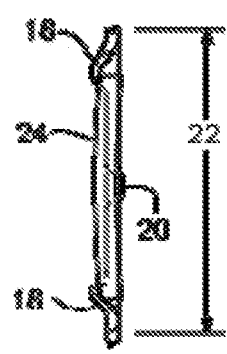
FIG. 1
FIG. 2
FIG. 3

METHOD AND MEANS OF DISBURSING OR DISPLAYING FISH ATTRACTANT INSERT FROM A DIVER

FIELD OF THE INVENTION

This invention relates to the field of fishing divers (hereinafter "Divers") and more particularly to the field of Divers that contain inserts for attracting fish.

BACKGROUND OF THE INVENTION

Divers have been used by anglers for many years. The Divers are made in a variety of sizes, shapes, weights and finishes and from a variety of different materials. They can be made from a single component or multiple components. The purpose of a Diver is to take a lure or bait to a predetermined depth and/or position in relationship to the boat that they are being trolled from.

Anglers have used various lures, baits and types of attractants to entice both freshwater and saltwater fish to strike at a lure or bait.

To that end, in the preferred embodiment of this invention, a Diver is modified to accommodate at least one of a type of easily insertable and replaceable fish attractant (hereinafter "Insert").

Inserts are semi-rigid and cylindrical in shape. Inserts all produce, are composed of or are coated with at least one of a: 1) chemical light that produces at least one color of light; 2) a type of fish attracting scent; or 3) a color and may vary in size.

For centuries, fishermen have used a variety of different methods to attract both freshwater and saltwater fish to their fishing lure(s) or baited fish hooks. Divers have been used to attract fish to the lure or bait that is trolled through the water. However, there are some basic limitations:

The first being that the effectiveness of the color and reflectiveness of a lure is affected by the amount of ambient sunlight or moonlight penetrating the surface of the water and is diminished as the depth from the surface increases. The same is true in regards to the clarity of the water. If it is unclear or muddy penetration of natural light into the water is diminished even greater. This is also true of natural light on cloudy days, during inclement weather conditions and moonless nights.

Anglers have used man-made lights to attract various species of fish to a lure or bait. However, these have met with limited success.

It is also well recognized within the sport-fishing industry that both freshwater and saltwater fish are attracted by scent in the water. It has been proven that sharks can detect blood in the water from many miles away.

While there are scents specifically designed for use with lures, they are commonly in the form of spray on liquids, aerosols and gels. These means of applying a scent to a lure have proven to be impractical because they are messy; and are not cost effective. Moreover, they are difficult to apply to a lure while standing on a rolling deck.

Other scents are attached to the lure or are positioned ahead of the lure; these scents adversely affect the lure's action.

Finally, it is a well-established fact in the sport-fishing industry that certain colors attract fish on certain days or in certain water conditions or light conditions. Anglers traditionally carry a variety of different colors of the same type lure in their tackle box. These Lures not only are of a variety of colors, they are made of reflective material or made of material that has been highly polished to a reflective finish.

SUMMARY OF THE INVENTION

This invention is a modification of a Diver that provides anglers with a means of adding a chemical light and/or a type of fish attractant scent to the main body of the Diver. This method provides anglers not only the advantage of being able to utilizes two types of attractants at the same time, it provides a means to provide them in a cost effective and practical manner.

In the preferred embodiment of this invention, the Diver has at least one of a cavity that accommodates an Insert, which runs parallel to the centerline of the main body of the Diver and does not adversely affect the performance of the Diver while it is being retrieved or trolled through water.

Depending upon the type of Diver, the at least one of a cavity may run along the centerline of the main body of the Diver. On some Divers, more than one cavity may run along the centerline of the main body of the Diver and run parallel to each other or at an angle to the centerline of the main body of the Diver.

At the ends of each cavity is a portion of the main body of the Diver that is cupped towards the first side of the Diver to accommodate an Insert. The cupped portions are slightly wider than the diameter of the Insert and slightly deeper than the radius of the Insert. The cupped portions are open on the second side of the Diver.

Each cavity has at least one strap that is a portion of the main body of the Diver, which arches towards the second side of the main body of the Diver. The at least one strap opposes the cupped portions at the ends of each cavity. The at least one strap accommodates the insertion of an Insert and is slightly wider than the diameter of the Insert and slightly deeper than the radius of the Insert. The purpose of this strap is to cradle the Insert and hold it securely in place.

Some types of Divers have may or may not have at least one strap, similar to what has been described above, with the exception that the at least one strap arches towards the first side of the Diver, similar to the cupped portions.

The cupped ends of the cavity and the at least one of a strap could be reversed in their relationship to the first side and second side of the Diver. The number of straps may also vary, based upon the size of the Diver and the length of the Inserts and may also vary as to their locations relative to the cupped portions of the main body of the Diver.

BRIEF DESCRIPTION OF THE DRAWINGS

A description for each of the figures of the drawings is as follows:

FIG. 1 is a perspective view showing my new design with two cavities to retain Inserts;

FIG. 2 is a fragmentary view of a portion of FIG. 1 with Inserts inserted in the cavities;

FIG. 3 is a cross-section view taken along lines 3-3 of FIG. 2 with the Inserts inserted;

DETAILED DESCRIPTION OF THE DRAWINGS

Figure 4:
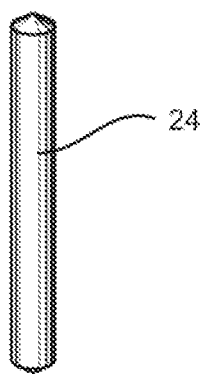
FIG. 4 is a perspective view of an Insert.

FIG. 1 shows a perspective view of a Diver (10) showing the first side (12) of the main body (14) with two cavities (16) running parallel to each other and parallel to the centerline of the main body (14) of the Diver (10). Each cavity (16) has a cupped portion (18) at each end that are arches towards the first side (12) of the main body (14) and at least one of a strap (20) that arches towards the second side (22) of the main body (14) of the Diver (10). The cupped portions (18) are slightly greater in width than the diameter of an Insert (24) and slightly deeper than the radius on an Insert in depth. The at least one of a strap (20) likewise are slightly greater in width than the diameter of an Insert (24) and slightly deeper than the radius on an Insert (24) in depth.

FIG. 2 is a fragmentary view of the first side (12) of the main body (14) of the Diver (10,) showing in greater detail the relationship of the cupped portions (18) at the ends of the cavities (16) to the straps (20).

FIG. 3 is a cross-section view of the main body (14) of the Diver (10) and how an Insert (24) relates to the cupped portions (18) and the straps (20).

FIG. 4 perspective view (respectively) of an Insert (24).

Changes and modifications in the specifically described in the embodiments can be carried out without departing from the scope of this invention, which is intended to be limited only by the scope of the appending claims.

The invention claimed is:

1. A diver for attracting fish, comprising:
a. at least one fish attracting insert having two ends;
b. a main body in the shape of a diver, said main body having a first side and a second side;
c. at least one oblong cavity located through the main body;
d. a cupped portion located at opposite ends of said at least one oblong cavity, said cupped portions arching away from the first side of the main body and being open on the second side of the main body;
e. the at least one fish attracting insert removably received within said cupped portions; and
f. at least one strap extending over the oblong cavity and arching away from the second side of the main body, said strap extending over the at least one fish attracting insert when the fish attracting insert is received within said cupped portions, wherein said at least one fish attracting insert located within the cavity does not adversely affect the performance of the main body as it is being retrieved or trolled through water.

2. A diver for attracting fish as in claim 1 wherein:
a. the fish attracting insert is a semi-rigid and cylindrical rod and said fish attracting insert is slightly narrower and shorter in length than the cavity.

3. The fish attractor as in claim 2, wherein:
a. the semi-rigid and cylindrical rod is comprised of a chemical light that when activated gives off a light that attracts fish.

4. A diver for attracting fish as in claim 2, wherein:
a. the semi-rigid and cylindrical rod is comprised of a chemical light that when activated gives off a light that attracts fish and is coated with a fish attracting scent.

5. A diver for attracting fish as in claim 2, wherein:
a. the semi-rigid and cylindrical rod is comprised of a fish attracting scent.

6. A diver for attracting fish as in claim 2, wherein:
a. the semi-rigid and cylindrical rod is coated with fish attracting scent.

7. A diver for attracting fish as in claim 2, wherein:
a. the semi-rigid and cylindrical rod comprises a color that attracts fish.

8. A diver for attracting fish as in claim 1, wherein:
a. the fish attracting insert that is placed in the cavity of the body is selected from a group consisting of fish attracting inserts that attract fish by means of light, scent, or color.

9. A diver for attracting fish as in claim 1 wherein:
a. the at least one fish attracting insert within the cavity runs parallel to the centerline of the main body.

10. The diver for attracting fish as in claim 1, wherein said at least one insert and at least one oblong cavity comprises two inserts and two oblong cavities.

11. A diver for attracting fish as in claim 10 wherein:
a. the fish attracting insert and the second fish attracting insert are interchangeable.

12. A diver for attracting fish as in claim 10 wherein:
a. fish attracting insert within the cavity and the second fish attracting insert with in the second cavity runs parallel to the centerline of the main body and parallel to each other.

* * * * *